United States Patent [19]

Rendessy

[11] 4,052,085
[45] Oct. 4, 1977

[54] FLEXIBLE CONNECTORS FOR TRAILER SWAY CONTROL DEVICES

[76] Inventor: William L. Rendessy, 4231 E. Rancho Drive, Phoenix, Ariz. 85018

[21] Appl. No.: 619,842

[22] Filed: Oct. 6, 1975

Related U.S. Application Data

[63] Continuation-in-part of Ser. No. 502,058, Aug. 30, 1974, Pat. No. 3,920,266.

[51] Int. Cl.² ............................................. B60D 7/00
[52] U.S. Cl. ................................ 280/446 B; 188/1 B
[58] Field of Search .......... 280/446 B, 446 R, 456 R, 280/179 A; 188/1 B; 24/68 CD, 68 BT, 68 T, 68 SC; 74/520; 254/77, 78, 79, 80

[56] References Cited

U.S. PATENT DOCUMENTS

| 1,277,797 | 9/1918 | Watts | 248/78 |
| 1,885,128 | 11/1932 | Montgomery | 280/179 A |
| 2,539,997 | 1/1951 | Graves | 280/179 A X |
| 2,919,895 | 1/1960 | Johnson | 280/179 A X |
| 3,379,456 | 4/1968 | Bogie | 280/446 B |
| 3,680,891 | 8/1972 | Rendessy | 280/446 B |
| 3,871,686 | 3/1975 | Rendessy | 280/446 B |

Primary Examiner—Philip Goodman
Assistant Examiner—R. Schrecengost
Attorney, Agent, or Firm—Warren F. B. Lindsley

[57] ABSTRACT

A tension controllable flexible connector for sway control devices for trailers passing over a frictionally damping surface or surfaces for preventing uncontrolled lateral movements of a towed vehicle.

The flexible connector comprising a recently available tough, durable belt equal in strength to cable or chain has an external surface suitable for frictional damping use and is connected to the towed or towing vehicle by suitable connectors one of which is a toggle release means. A curved or arcuate structure is used in conjunction with the flexible connector for providing the friction damping surface which limits undesirable sway of the trailer. Simplicity of installation, operation and interchangeability of the flexible connector for use on other trailers to be towed by the same vehicle are features of the disclosed device.

13 Claims, 4 Drawing Figures

U.S. Patent  Oct. 4, 1977  4,052,085
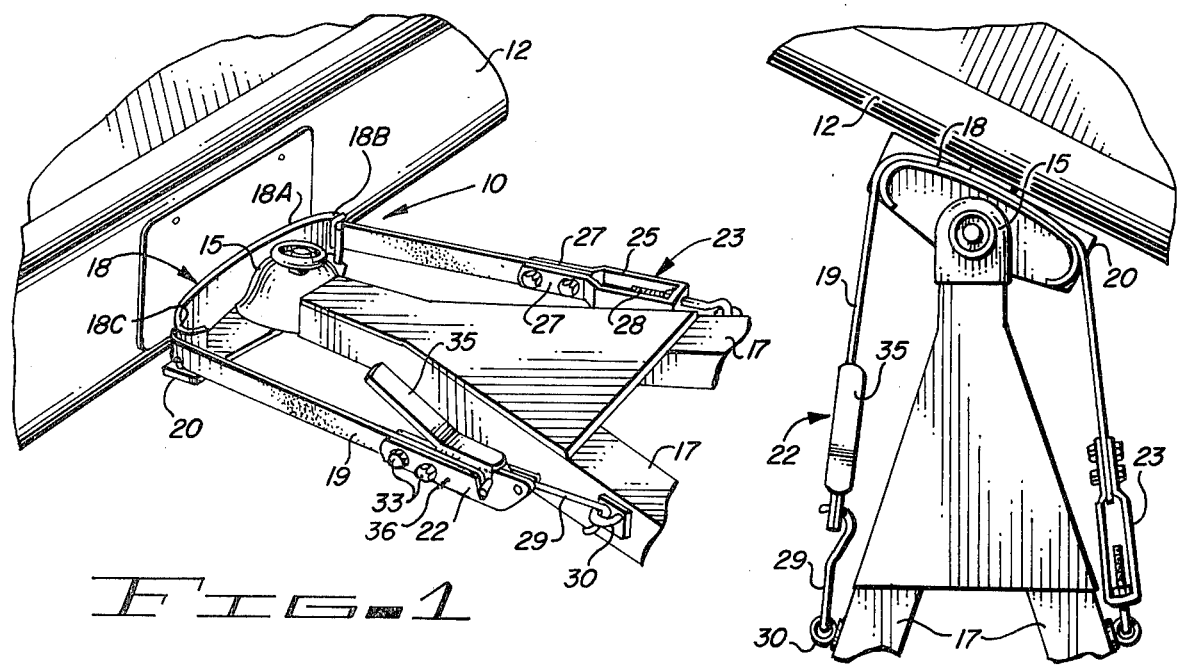
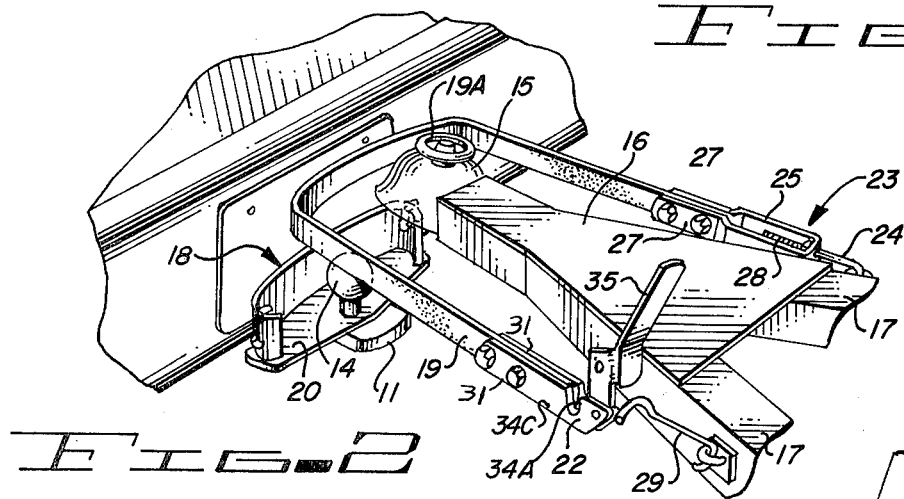
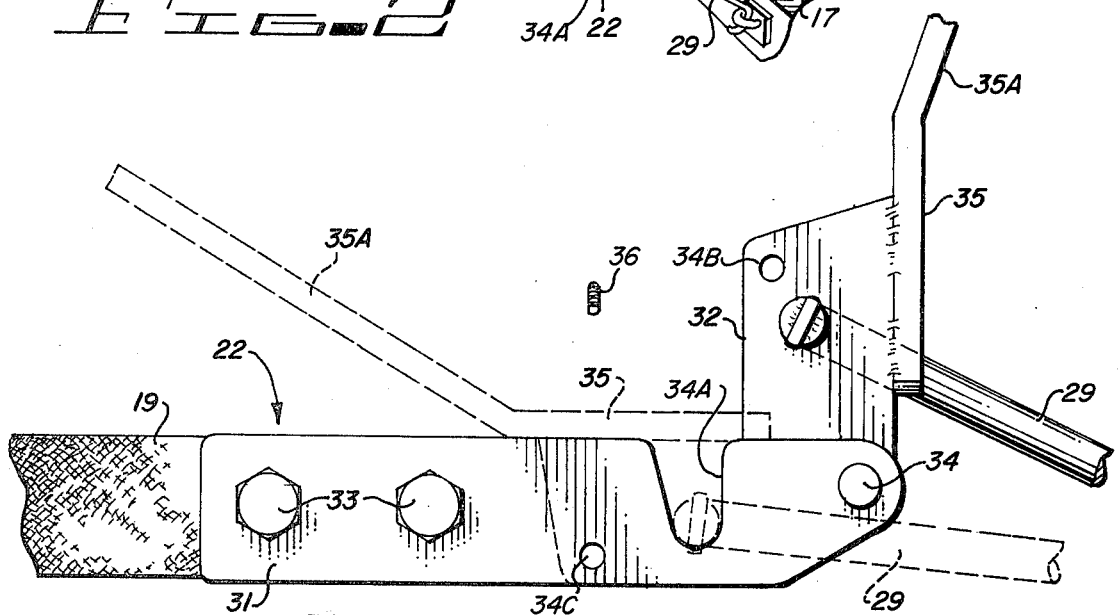

FLEXIBLE CONNECTORS FOR TRAILER SWAY CONTROL DEVICES

The application is a Continuation in Part of Application, Ser. No. 502,058, filed Aug. 30, 1974 and now U.S. Pat. No. 3,920,266 entitled DUAL PURPOSE TRAILER SWAY CONTROL DEVICE AND SAFETY CONNECTOR FOR MOUNTING ON EITHER THE TOWED OR TOWING VEHICLE, by the same inventor.

BACKGROUND OF THE INVENTION

The use of towed trailers behind automobiles and lightweight trucks has become quite commonplace and the hazards associated with such vehicular combinations are well known. A particularly dangerous characteristic of the towed trailer is its tendency to sway from side to side under conditions initiated by sudden turns, cross winds, air drafts produced by passing trucks, improper loading of the trailers, among other things. Certain combination of various parameters such as the length of the trailer tongue, the weight of the load, and the surface of the highway increase the tendency for the trailer to sway and even increase the intensity or amplitude of the swaying action once it has started. Under such conditions it is difficult, if not impossible, for the driver of the towing vehicle to maintain control of his vehicle. The combination of the towing vehicle and the trailer in the presence of such critically related parameters contributes an unstable mechanical system.

Prior art disclosures have attempted to lessen or prevent the swaying motion of trailers. Some of these devices are complicated in structure involving pulleys or spools, brake shoes, telescoping structures employing friction or hydraulic dumping means and usually have numerous parts requiring periodic replacement otherwise the devices may become dangerous within themselves. Furthermore, some prior art devices employ only one means of connection on only one side of the longitudinal axis of the towed trailer to obtain sway control presenting a potentially dangerous condition should the trailer tongue break away from the towing vehicle when in motion.

SUMMARY OF THE INVENTION

In accordance with the invention claimed, an improved flexible connector for sway control devices having one or more fixed curved or arcuate surfaces adapted to be mounted on the hitch bracket of a towing vehicle is provided. The disclosed flexible connector may be utilized to interconnect and secure two or more objects together and, for example, opposite sides of a trailer being towed.

Below center toggle means and screw type adjustment means are provided to cause tension in the flexible means inducing frictional restraint of movement of the flexible means about the curved or arcuate surfaces coincident with any lateral movement of the towed vehicle.

It is, therefore, one object of this invention to provide an improved flexible connector for a novel sway control device for interconnecting a towed and towing vehicle.

Another object of this invention is to provide a sway control device utilizing a flexible connector in conjunction with a below center toggle mechanism and an adjustable turn buckle threaded only at one end having tensile strength equivalent to a chain linkage.

A further object of this invention is to provide a novel flexible connector for sway control devices which employs external surfaces suitable for frictional damping use along curved or arcuate surfaces of a sway control device.

A still further object of this invention is to provide a novel toggle release and screw adjustable means for a flexible interconnecting means for interconnecting and securing two objects to each other.

A still further object of this invention is to provide an improved flexible interconnecting means including a novel toggle release mechanism as part thereof.

A still further object of this invention is to utilize an improved flexible belt in combination with a novel toggle release mechanism mounted at one end thereof for functioning as part of a sway control device for trailers which is interconnectable between the towed and towing vehicle.

A still further object of this invention is to provide a dual function safety connector for a trailer sway control device that would prevent the tongue of a trailer from dropping to the road in event it accidentally became disconnected from the towing vehicle while being towed.

A still further object of this invention is to provide a novel flexible connector for sway control devices which requires little or no maintenance.

A still further object of this invention is to provide a novel flexible connector for a sway control device which is easily installed, connected and adjusted for operation.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described be reference to the accompanying drawing in which:

FIG. 1 is a perspective view showing one model or embodiment of an improved sway control device mounted on the conventional hitch bracket of a towing vehicle and connected to the tongue of a trailer and embodying the new and novel flexible connector.

FIG. 2 is a view similar to FIG. 1 with the sway control device shown in a position over the hitch ball of a hitch bracket.

FIG. 3 shows a partial plan view of a sway control device similar to that shown in FIG. 1 with the towing vehicle in an angular position to the towed vehicle.

FIG. 4 is an enlarged partial view of the connector tensioning device shown in FIGS. 1-3.

DESCRIPTION OF THE PREFERRED EMBODIMENT

Referring more particularly to the drawings by characters of reference, FIGS. 1-3 disclose a sway control device 10 comprising curved surface 18 and plate 20 mounted on a conventional towing hitch 11 of a vehicle 12 and having a hitch ball 14 bolted thereto to extend substantially vertically therefrom for receiving a hitching ball socket or coupler 15. Coupler 15 has its rearward extending shank 16 fixed to the forward joined ends of a pair of hitching arms 17 of a trailing vehicle (not shown) by suitable means to form a part of the tongue of a trailer.

The sway control device 10 comprises one or more curved surfaces 18 fixedly mounted on either the towing hitch 11 of the towing vehicle, as shown in FIGS. 1-3, or on the hitching arms 17 or ball socket shank 16 of the towed vehicle in U.S. Pat. No. 3,871,684 of William L. Rendessy.

FIGS. 1-3 illustrate the curved surface 18 comprising a cup shaped metallic strip like configuration formed to curve partly around the hitch ball 14 to provide on its outer circumference friction bearing surfaces 18A, 18B and 18C for a flexible connector 19 herein shown in a belt like configuration.

The curved surface 18 is suitably connected such as by welding on one edge to a flat plate 20 which is secured in turn to the trailer hitch bracket 11. Flat plate 20 is provided with an aperture 21 therethrough, as shown in FIG. 5, for receiving the hitch ball 14.

It should be recognized that the flat plate 20 and curved convex surface 18 may be welded or otherwise secured to the towing hitch 11 or to the flat surface of a step bumper of a truck and sold as a unit or part of the towing hitch bracket or independently thereof as a separate sway control device for attachment to the towing hitch bracket or hitching arms 20 of a towed vehicle.

The flexible connector 19 may comprise a cable or a belt such as urethane or polyvinyl material with polyester or nylon having flexibility and wear characteristics of tough heavy duty conveyor belting. This connector is placed over the curved surface 18 of the sway control device 10 around its outer circumferential surfaces 18A, 18B and 18C of FIG. 1 and suitably connected at one end by means of a toggle release or clamp 22 to the hitching arms 17 of the towed vehicle and at its second end through a turnbuckle 23 and hook 24 to the other hitching arm 17 of the towed vehicle. Turnbuckle 23 is utilized to adjust the belt or cable as desired.

Turnbuckle 23 comprises an elongated housing 25 having a longitudinal slot 26 with an axial threaded opening only at one end thereof. The other end of the housing is provided with a pair of juxtapositioned longitudinally extending arms 27 which are arranged to have extending therebetween in bolted connection thereto one end of belt 19, as shown in FIGS. 1 and 2. A single stud 28 is threaded into the axial opening in housing 25 of the turnbuckle which in turn is pivotally attached to hitching arms 17 of the towed vehicle by a simple hook and eye arrangement, as shown. Since only one stud is used, the turnbuckle has to be disconnected to turn. The flat sided construction of turn buckle 23 is particularly adaptable for sandwiching a belt therebetween to obtain maximum securement.

The toggle release 22 is bolted or riveted to the other end of belt 19 as shown in FIGS. 1 and 2 and connects by means of a hook 29 to an eye bolt 30 which is attached to the hitching arms 17 of the towed vehicle. This toggle release provides a means for quickly applying or releasing tension in belt 19 for tightening or disconnecting the sway control device 10 from the towed or towing vehicle.

As shown in FIG. 4, the toggle release comprises a pair of elongated outer members 31 having an inner member 32 pivotally attached at one end for nesting inside of members 31 with hook 29 pivotally mounted within outer members 31. Outer members 31 are in the form of two parallel flat metal straps joined together by transverse metal pins 33 tightly holding between the straps the end of belt 19.

When inner member 32 of the toggle release is fully nested inside outer members 31, it is in a below center position.

In the nested position and with hook 29 attached to a fixed point on the hitching arm 17, as shown in FIGS. 1 and 2, tension is applied belt 19. Member 32 is kept in the dotted position by hook 29 dropping below pin 34, as shown in FIG. 4, which causes it and members 31 to form a below center locked toggle configuration. To release the toggle, end 35A of plate 35 hook 29 must be lifted back over center to open the lock.

To release toggle release 22 in the presence of belt tension, the raised end 35A of plate 35 may be grasped and forced upwardly against the downward force produced by the belt tension. As inner member 32 thus raises in its rotation about pin 34, the effective length of the toggle release assembly increases and relieves the tension. The increased effective length of the toggle release in the fully released position also allows for the disengagement of hook 29 from ring 30 or other means to which it had been attached.

Apertures 34B and 34C may be provided in members 31 and 32 respectively to extend in alignment through members 31 and 32 when the toggle is in a locked position so that a spring pin 36 of any suitable type extending through these apertures would prevent the possibility of the toggle lever from being accidentally unlocked.

To prepare sway control device 10 for use, the trailer hitch ball socket is first coupled to the towing vehicle by placing and firmly attaching the coupler over the hitch ball 14. The ends of belt 19 are attached as shown in FIGS. 1 and 2 through hooks 24 and 29 to the hitching arms 17 of the towed vehicle. The intermediate portion 19A of the belt 19 is then placed around the outer circumferential friction bearing curved surface 18 of the sway control device. Thus, belt 19 makes contact with the curved surface 18 of the sway control device when the toggle release 22 is forced to the nested or closed position after turnbuckle 23 is adjusted to produce the desired tension in belt 19 which now follows a curved path beginning at one end of curved surface 19 and passing around its full curved surface, as shown in FIG. 1, to its point of attachment to turnbuckle 23.

As tension in belt 19 is increased, belt 19 bears against curved surface 18 with increasing pressure and the additional force which must be applied to overcome this friction to produce relative displacement between belt 19 and the outer peripheral bearing surface of curved surface 18 is correspondingly increased.

As shown in FIGS. 1, 2 and 3, the curved surface 18 comprises an intermediate curved surface 18A terminating in two similar curved end is so configured with its relationship to the coupler as to provide the proper turning arrangement so as to keep the belt 19 free from all obstructions when the towed and towing vehicle assume any angular position.

It should be recognized that the use of the disclosed sway control devices eliminates the need for the usual safety chains on towed vehicles since belt 19 serves that purpose and is at least an equivalent in strength. It at all times is around and interconnected with the towed vehicle when taut and thus serves the safety chain purpose.

It also should be noted that the claimed subject matter may be utilized to interconnect two member or operate objects together whether or not for sway control purposes.

Although but a single embodiment of the present invention has been illustrated and described, it will be apparent to those skilled in the art that various changes and modifications may be made therein without departing from the spirit of the invention or from the scope of the appended claims.

What is claimed is:

1. A tension controllable flexible connector means for a sway control device for trailers which passes over a frictionally damping surface for preventing uncontrolled lateral movement of the towed trailer comprising:

a flexible belt connector comprising first and second means and an intermediate portion, said first and second ends adaptedly securable to spaced positions on a vehicle, said intermediate portion of said connector adapted to cooperatively engage the external surfaces of a curved guiding surface of the sway control device in a taut manner to cause frictional damping thereon, and means connected to one end of said flexible connector for tightening and loosening the intermediate portion of said flexible connector from the curved surface of the sway control device, said means comprising a toggle release having an elongated first member secured at one end to said flexible connector and having a second movable toggle member pivotally mounted at the other end of said first member, said toggle member is pivotally connectable to the vehicle at a point along its length, and when moved to an over center position along the length of said first member increasing the tension of said flexible connector on the curved surface of the sway control device and when moved to its under center position releasing tension of said flexible connector on said curved surface, said flexible connector comprising a reinforced plastic belt.

2. The tension controllable flexible connector set forth in claim 1 wherein:

said flexible connector comprises a laminated plastic belt configuration.

3. The tension controllable flexible connector set forth in claim 1 wherein:

said flexible connector comprises a urethane reinforced with polyester.

4. The tension controllable flexible connector set forth in claim 1 wherein:

said flexible connector comprises a belt of polyvinyl material reinforced with nylon.

5. The tension controllable flexible connector set forth in claim 1 wherein:

said first member of said toggle release comprises a pair of elongated juxtapositioned flat members secured at one end to one end of said flexible connector and each having a groove formed in the periphery of their other ends, said toggle member having means for pivotally engaging one end of a pin pivotally connectable at its other end to the vehicle.

said toggle member when moved to said over center position moving the pivotally connected end of said pin in said toggle member into said grooves formed in said first member.

6. The tension controllable flexible connector set forth in claim 6 wherein:

said pin comprises a hook for pivotally connecting at one end to said toggle member at a point between its ends and pivotally connectable at its other end to the vehicle.

7. A flexible tensioning device utilized to interconnect and secure together two objects comprising in combination:

a flat reinforced plastic belt comprising opposite ends of an intermediate portion, an elongated toggle structure comprising a pair of juxtapositioned flat members, one end of said belt being sandwiched between, axially aligned with and secured to a first common end of said flat members, the other end of said belt being provided with a turnbuckle structure, said toggle structure further comprising a toggle member pivotally mounted at one end to and between the other common ends of said flat members for movement from a position laterally to said flat members to a position between and juxtapositioned to said flat members, a slot formed by aligned grooves in a common edge of said flat members in line of movement of said toggle member when moving to and from said flat members, a pin mounted at one end on said toggle member in a position such that one of its ends extends laterally through said toggle member, the end of said pin being moved into said slot when said toggle member is moved juxtapositioned to said members, whereby the end of said pin bears against a portion of the periphery of a said slot to share the force applyable to the pivotal connection of said toggle member.

8. The flexible tensioning device set forth in claim 7 wherein:

said toggle member is provided with a handle extending laterally therefrom for applying pressure on the pivotal connection of said toggle member to move said toggle member to and from its position between said flat members.

9. The flexible tensioning device set forth in claim 7 wherein:

the length of said pin extends between and outwardly of the ends of said flat members when said toggle member is positioned between said flat members.

10. The flexible tension device set forth in claim 7 wherein:

said turnbuckle structure comprises a U-shape configuration having its legs arranged on each side of said other end of said belt, and a pin threadly mounted to extend through the bight of said turnbuckle structure and engagement with one of the objects to be interconnected.

11. The flexible tensioning device set forth in claim 7 wherein:

said one end of said pin is flattened and engages a portion of the periphery of said slot when said toggle is moved to its over center locked position.

12. The flexible tensioning device set forth in claim 7 wherein:

said flat members are each provided with an aperture extending therethrough which are aligned with each other, said toggle member being provided with an aperture which extends therethrough and is in alignment with the apertures extending through said flat members when said toggle member is in its over center position, and a second pin for extending through the aligned apertures in said flat members and said toggle members for locking said toggle member in its over center position.

13. A flexible tensioning device utilized to interconnect and secure together two objects comprising in combination:

an elongated toggle structure comprising a pair of juxtapositioned flat members, one common end of said flat members being arranged for receiving therebetween a flat belt in axial aligned relationship therewith, said toggle structure further comprising a toggle member pivotally mounted at one end to and between the other common ends of said flat members for movement from a position laterally to said flat members to a position between and juxtapositioned to said flat members, a slot formed by aligned grooves in a common edge of said flat members in line of movement of said toggle member when moving to and from said flat members, a pin mounted at one end on said toggle member in a position such that its end extends laterally through said toggle member, the end of said pin being moved into said slot when said toggle member is moved juxtapositioned to said members, whereby the end of said pin bears against a portion of the periphery of a said slot to share the force applyable to the pivotal connection of said toggle member, said toggle member being provided with a handle extending laterally therefrom for applying pressure on the pivotal connection and said toggle member to move said toggle member to and from its position between said flat members, the length of said pin extending between and outwardly of the ends of said flat members when said toggle member is positioned between said flat members, said one end of said pin being flattened and engages a portion of the periphery of said slot when said toggle is moved to its over center locked position, said flat members each being provided with an aperture extending therethrough which are aligned with each other, said toggle member being provided with an aperture which extends therethrough and is in alignment with the aperatures extending through said flat members when said toggle member is in its over center position, and a second pin for extending through the aligned aperture in said flat members and said toggle members for locking said toggle member in its over center position.

* * * * *

UNITED STATES PATENT OFFICE
CERTIFICATE OF CORRECTION

Patent No. 4,052,085   Dated October 4, 1977

Inventor(s) William L. Rendessy

It is certified that error appears in the above-identified patent and that said Letters Patent are hereby corrected as shown below:

Claim 1, line 7, cancel "means" and substitute ---ends---.

Claim 5, line 10, cancel the period and substitute ---,---.

Claim 7, line 5, cancel "of" and substitute ---and---.

Signed and Sealed this

Twenty-fourth Day of January 1978

[SEAL]

Attest:

RUTH C. MASON
*Attesting Officer*

LUTRELLE F. PARKER
*Acting Commissioner of Patents and Trademarks*